US009189149B2

(12) United States Patent  (10) Patent No.: US 9,189,149 B2
Vojak  (45) Date of Patent: Nov. 17, 2015

(54) EQUIVALENT GESTURE AND SOFT BUTTON CONFIGURATION FOR TOUCH SCREEN ENABLED DEVICE

(71) Applicant: Sharp Laboratories of America, Inc., Camas, WA (US)

(72) Inventor: William John Vojak, Battle Ground, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 337 days.

(21) Appl. No.: 13/848,659

(22) Filed: Mar. 21, 2013

(65) Prior Publication Data

US 2014/0289682 A1  Sep. 25, 2014

(51) Int. Cl.
*G06F 3/0488* (2013.01)
*G06F 3/01* (2006.01)
*G06F 9/44* (2006.01)

(52) U.S. Cl.
CPC .......... *G06F 3/04883* (2013.01); *G06F 3/017* (2013.01); *G06F 9/4443* (2013.01)

(58) Field of Classification Search
CPC .... G06F 3/04883; G06F 3/017; G06F 9/4443
USPC ................................. 715/863, 762
See application file for complete search history.

(56) References Cited

U.S. PATENT DOCUMENTS

| | | | |
|---|---|---|---|
| 6,057,845 A * | 5/2000 | Dupouy | 715/863 |
| 6,097,392 A | 8/2000 | Leyerle | |
| 6,408,302 B1 * | 6/2002 | Lee et al. | 1/1 |
| 7,770,136 B2 | 8/2010 | Beeck et al. | |
| 8,436,821 B1 * | 5/2013 | Plichta et al. | 345/173 |
| 2003/0172109 A1 * | 9/2003 | Dalton et al. | 709/203 |
| 2006/0010400 A1 | 1/2006 | Dehlin et al. | |
| 2009/0138830 A1 | 5/2009 | Borgaonkar et al. | |
| 2009/0254868 A1 | 10/2009 | Bokor et al. | |
| 2010/0064261 A1 | 3/2010 | Andrews et al. | |
| 2010/0185949 A1 * | 7/2010 | Jaeger | 715/730 |
| 2010/0275166 A1 | 10/2010 | Jeon et al. | |
| 2011/0009195 A1 | 1/2011 | Porwal | |
| 2011/0246952 A1 | 10/2011 | Tsao | |
| 2011/0279384 A1 | 11/2011 | Miller et al. | |
| 2012/0017161 A1 | 1/2012 | Hirshberg | |

OTHER PUBLICATIONS

Ellis, Graham, "Getting rid of variables after you have finished with them," (Mar. 2, 2007), available at http://www.wellho.net/mouth/748_getting-rid-of-variables-after-you-have-finished-with-them.html [retrieved Apr. 17, 2015].*

Posting of eed3si9n to stackoverflow, "What is the difference between equality and equivalence?" (Jul. 2, 2009) (available at http://stackoverflow.com/questions/311936/what-is-the-difference-between-equality-and-equivalence) [retrieved Apr. 17, 2015].*

* cited by examiner

*Primary Examiner* — Stephen Hong
*Assistant Examiner* — Shahid Khan
(74) *Attorney, Agent, or Firm* — Scot A. Reader

(57) ABSTRACT

Methods and systems for configuring on touch screen enabled devices custom gestures and custom soft buttons that are equivalent to default gestures configured on such devices allow equivalent custom gestures and soft buttons to be configured seamlessly on such devices without invoking a configuration tool or widget, enable multiple custom gestures and soft buttons equivalent to a particular default gesture to coexist on such devices and permit sets of personal equivalent custom gestures and soft buttons to be saved and loaded on such devices by particular users.

15 Claims, 12 Drawing Sheets

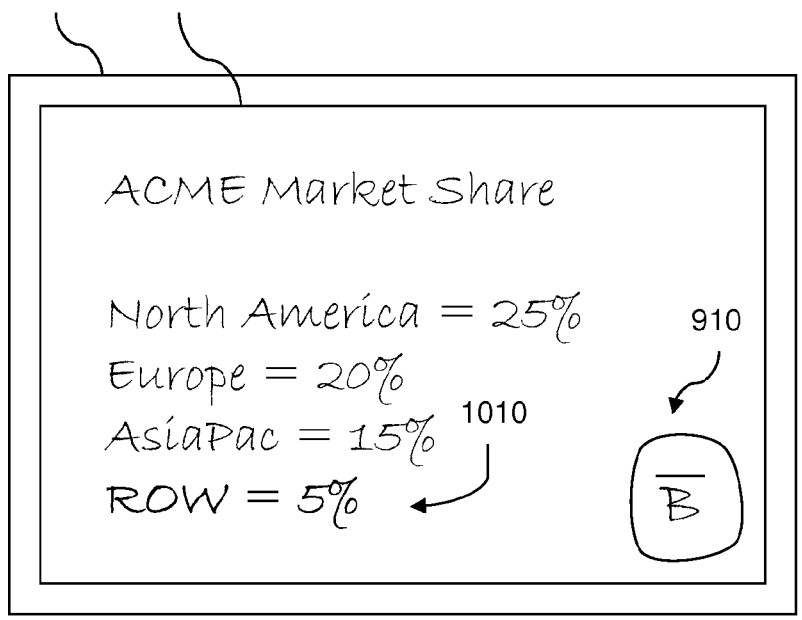
Fig. 10
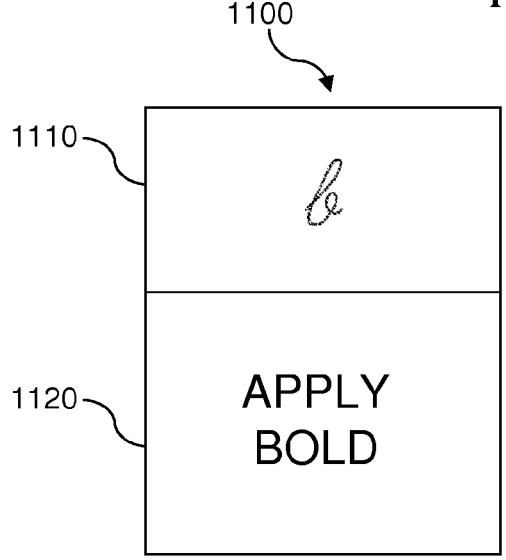
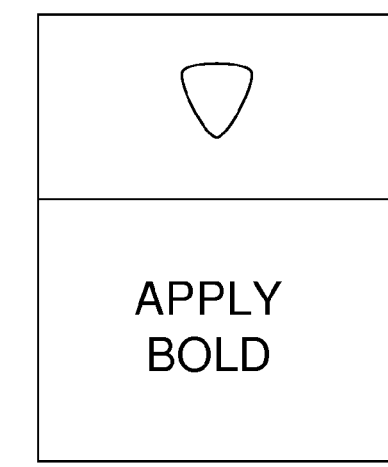
Fig. 11

```
┌─────────────────────────┐
│   RECEIVE AS HAND-DRAWN │
│     TOUCH SCREEN INPUT  │
│   INCOMPLETE EXPRESSION │
│  JUXTAPOSING EQUIVALENT │          Fig. 15
│    CUSTOM GESTURE AND   │
│      EQUALITY SYMBOL    │
│                   1510  │
└───────────┬─────────────┘
            │
            ▼
┌─────────────────────────┐
│      START TIMER        │
│                   1520  │
└───────────┬─────────────┘
            │
            ▼                          ┌─────────────────────────┐
┌─────────────────────────┐            │  RECONFIGURE IN MEMORY  │
│   EXPRESSION COMPLETED  │     Y      │    CUSTOM GESTURE AS    │
│   BEFORE EXPIRATION     ├───────────▶│  EQUIVALENT OF GESTURE  │
│       OF TIMER?         │            │    USED TO COMPLETE     │
│                   1530  │            │       EXPRESSION        │
└───────────┬─────────────┘            │                   1535  │
            │ N                        └─────────────────────────┘
            ▼
┌─────────────────────────┐                     Fig. 16
│    REMOVE FROM MEMORY   │
│    CONFIGURATION OF     │
│    CUSTOM GESTURE AS    │            ┌─────────────────────────┐
│    EQUIVALENT GESTURE   │            │   RECEIVE AS HAND-DRAWN │
│                   1540  │            │     TOUCH SCREEN INPUT  │
└─────────────────────────┘            │   EXPRESSION EQUATING   │
                                       │   EQUIVALENT CUSTOM     │
                                       │   GESTURE AND REMOVAL   │
                                       │         SYMBOL          │
                                       │                   1610  │
                                       └───────────┬─────────────┘
                                                   │
                                                   ▼
                                       ┌─────────────────────────┐
                                       │    REMOVE FROM MEMORY   │
                                       │    CONFIGURATION OF     │
                                       │    CUSTOM GESTURE AS    │
                                       │    EQUIVALENT GESTURE   │
                                       │                   1620  │
                                       └─────────────────────────┘
```

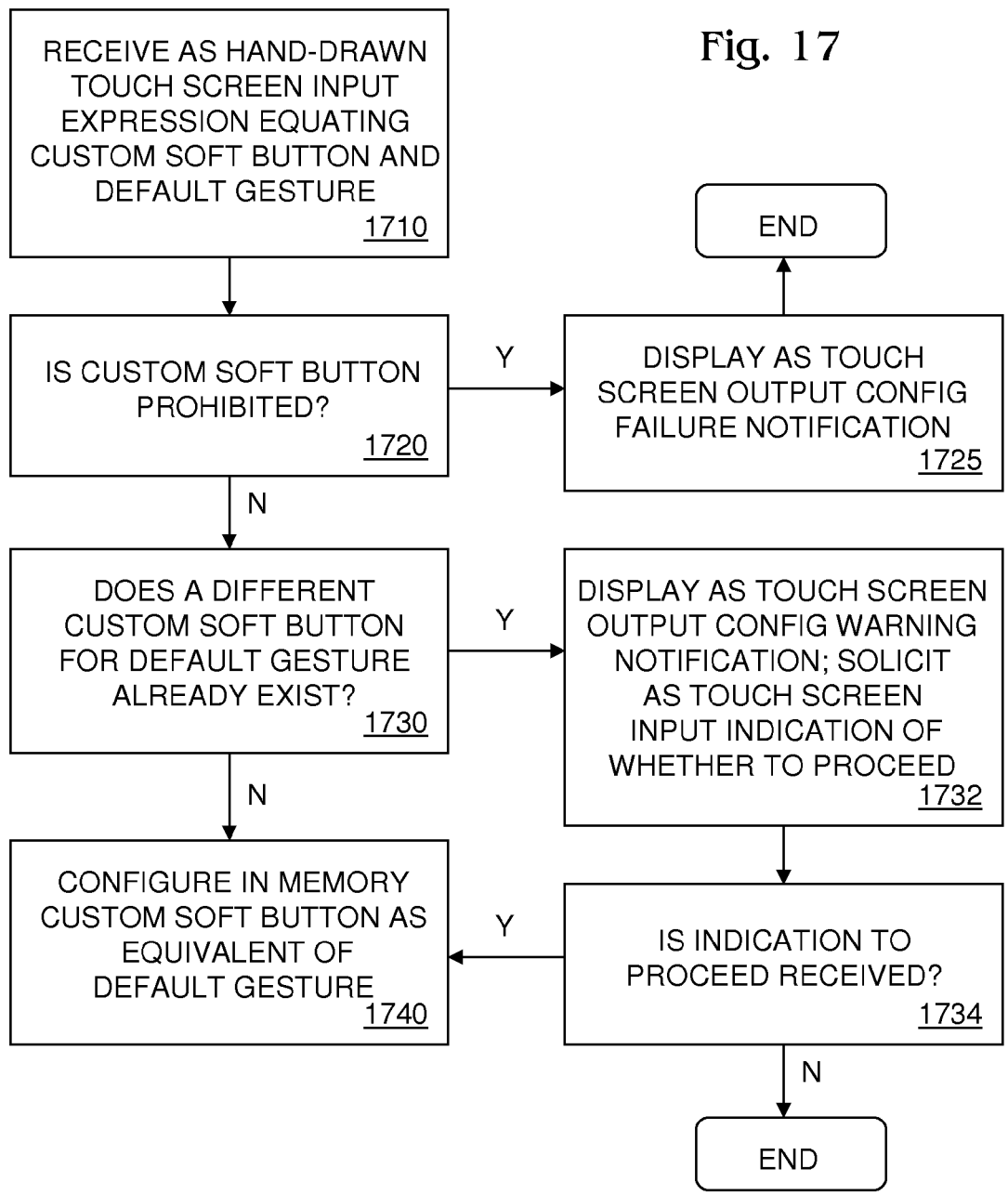

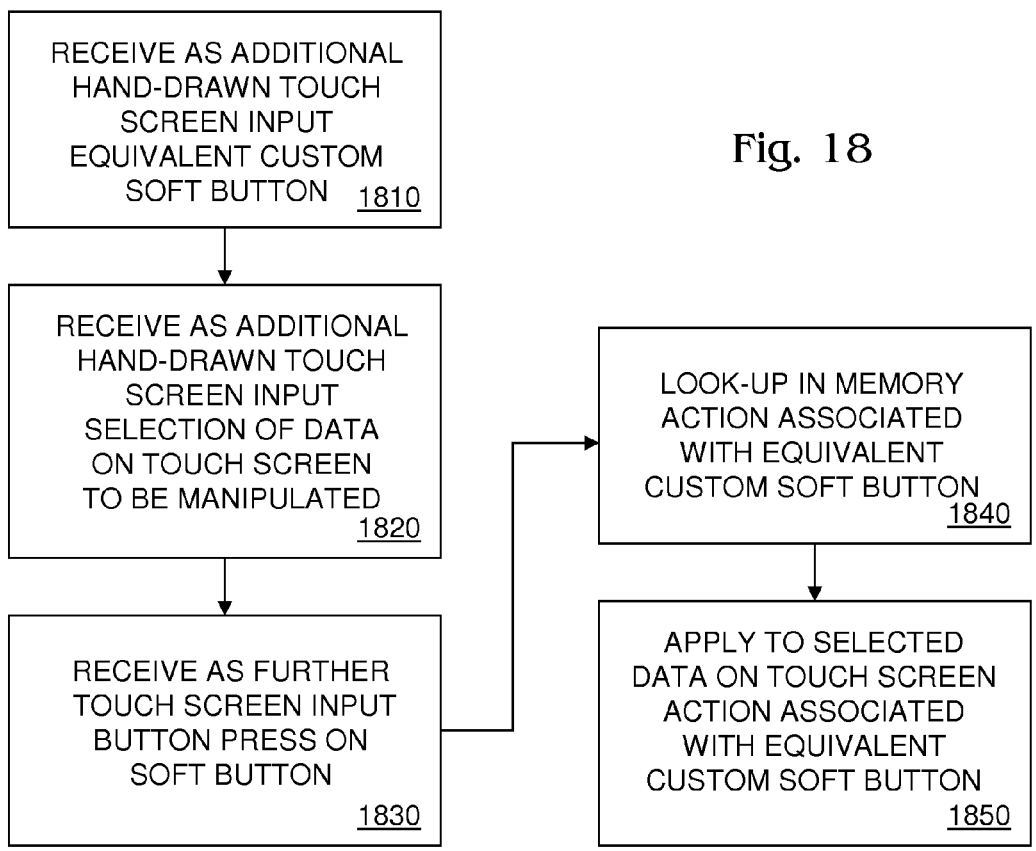

EQUIVALENT GESTURE AND SOFT BUTTON CONFIGURATION FOR TOUCH SCREEN ENABLED DEVICE

BACKGROUND OF THE INVENTION

The present invention relates to configuration of custom gestures and custom soft buttons on touch screen enabled devices.

Touch screen enabled devices, such as electronic white boards, tablet computers and smart phones, are often configured to recognize certain gestures and take certain screen actions in response to these gestures. An example of such a gesture is a hand-drawn symbol that causes selected screen text to be converted to boldface type. Configuration of touch screen enabled devices to recognize certain gestures can greatly enhance the utility of such devices for collaboration, such as when giving a presentation or editing a joint document.

Gestures recognized by some touch screen enabled devices are limited to default gestures configured on the devices by the manufacturer. Limiting recognized gestures to default gestures has many shortcomings. Some users may have trouble remembering the default gestures. This problem can be particularly serious for users who use several touch screen enabled devices that support different default gestures. Moreover, some users may have difficulty drawing certain default gestures. Also, temporary users (e.g., a corporate visitor giving a presentation on an electronic white board) may be unfamiliar with the default gestures. Additionally, some users may simply be uncomfortable with drawing gestures and prefer pressing action buttons to manipulate screen data.

Some touch screen enabled devices allow users to configure replacement gestures for default gestures by invoking a configuration tool or widget. Allowing a user to configure replacement gestures can help that particular user with remembering and drawing gestures. However, when a touch screen enabled device is used by multiple users, configuration of replacement gestures by one user will hinder use of the device by other users who are unfamiliar with the replacement gestures. Moreover, the requirement on these devices to invoke a configuration tool or widget to configure replacement gestures can disrupt the train of thought, presentation or workflow of a user. Furthermore, the ability to configure replacement gestures does not help the plight of users who do not like drawing gestures and prefer using action buttons to manipulate screen data.

SUMMARY OF THE INVENTION

The present invention provides methods and systems for configuring on touch screen enabled devices custom gestures and custom soft buttons that are equivalent to default gestures configured on such devices. The methods and systems allow equivalent custom gestures and soft buttons to be configured seamlessly on such devices without invoking a configuration tool or widget. The methods and systems further enable multiple custom gestures and soft buttons equivalent to a particular default gesture to coexist on such devices. The methods and systems further permit sets of personal equivalent custom gestures and soft buttons to be saved and loaded on such devices by particular users.

In one aspect of the invention, a touch screen enabled device comprises a memory having a default gesture defined therein; a touch screen interface configured to receive as hand-drawn input a first expression equating a first custom gesture with the default gesture; and a processor operatively coupled with the memory and the touch screen interface configured to establish in response to the first expression an equivalency between the first custom gesture and the default gesture.

In some embodiments, the memory has a first entry therein specifying drawing attributes of the default gesture and a screen action for the default gesture and establishing the equivalency comprises configuring in the memory a second entry specifying drawing attributes of the first custom gesture and the screen action.

In some embodiments, the memory has a first entry therein specifying drawing attributes of the default gesture and a screen action for the default gesture and establishing the equivalency comprises configuring in the memory a second entry specifying drawing attributes of first custom gesture and a pointer to the screen action.

In some embodiments, the processor is further configured to save the first custom gesture to a personal equivalency data file containing a plurality of custom gestures applicable to a particular user.

In some embodiments, the processor is further configured to determine whether an equivalency between a second custom gesture and the default gesture is established and display on the touch screen interface in response to determining that an equivalency between a second custom gesture and the default gesture is established a warning notification soliciting input on whether to proceed with establishing the equivalency between the first custom gesture and the default gesture.

In some embodiments, the touch screen interface is further configured to receive as additional hand-drawn input the first custom gesture and a selection of screen data to be manipulated, and the processor is further configured to determine using the first custom gesture a screen action associated with the first custom gesture and manipulate the selected screen data in accordance with the screen action.

In some embodiments, the touch screen interface is further configured to receive as additional hand-drawn input an incomplete expression juxtaposing the first custom gesture with an equality symbol, and the processor is further configured to remove in response to the incomplete expression the equivalency between the first custom gesture and the default gesture.

In some embodiments, the equality symbol comprises three stacked lines.

In some embodiments, the touch screen interface is further configured to receive as additional hand-drawn input a second expression equating the first custom gesture with a removal symbol, and the processor is further configured to remove in response to the second expression the equivalency between the first custom gesture and the default gesture.

In some embodiments, the first custom gesture is a symbol that is not an English letter and is not an Arabic number.

In another aspect of the invention, a touch screen enabled device comprises a memory having a default gesture defined therein; a touch screen interface configured to receive as hand-drawn input a first expression equating a first custom soft button with the default gesture; and a processor operatively coupled with the memory and the touch screen interface configured to establish in response to the first expression an equivalency between the first custom soft button and the default gesture.

In some embodiments, the memory has a first entry therein specifying drawing attributes of the default gesture and a screen action for the default gesture and establishing the equivalency comprises configuring in the memory a second entry specifying drawing attributes of the first custom soft button and the screen action.

In some embodiments, the memory has a first entry therein specifying drawing attributes of the default gesture and a screen action for the default gesture and establishing the equivalency comprises configuring in the memory a second entry specifying drawing attributes of first custom soft button and a pointer to the screen action.

In some embodiments, the processor is further configured to determine whether an equivalency between a second custom soft button and the default gesture is established and display on the touch screen interface in response to determining that an equivalency between a second custom soft button and the default gesture is established a warning notification soliciting input on whether to proceed with establishing the equivalency between the first custom soft button and the default gesture.

In some embodiments, the touch screen interface is further configured to receive as additional hand-drawn input the first custom soft button and a selection of screen data to be manipulated, and receive as further input a button press on the first custom soft button, and the processor is further configured to determine in response to the button press a screen action associated with the first custom soft button and manipulate the selected screen data in accordance with the screen action.

In some embodiments, the touch screen interface is further configured to receive as additional hand-drawn input an incomplete expression juxtaposing the first custom soft button with an equality symbol, and the processor is further configured to remove in response to the incomplete expression the equivalency between the first custom soft button and the default gesture.

In some embodiments, the touch screen interface is further configured to receive as additional hand-drawn input a second expression equating the first custom soft button with a removal symbol, and the processor is further configured to remove in response to the second expression the equivalency between the first custom soft button and the default gesture.

In some embodiments, the first custom soft button comprises a perimeter forming an enclosure, a symbol within the enclosure and a symbol validator within the enclosure.

In yet another aspect of the invention, a method for configuring a custom gesture that is equivalent to a default gesture on a touch screen enabled device comprises receiving by the device as hand-drawn input on a touch screen interface an expression equating a custom gesture with a default gesture; and establishing by the device in a memory in response to the expression an equivalency between the custom gesture and the default gesture.

In some embodiments, the method further comprises receiving by the device as additional hand-drawn input on the touch screen interface the custom gesture and a selection of screen data to be manipulated; determining by the device from the memory using the custom gesture a screen action associated with the custom gesture; and manipulating by the device the selected screen data in accordance with the screen action.

These and other aspects of the invention will be better understood by reference to the following detailed description taken in conjunction with the drawings that are briefly described below. Of course, the invention is defined by the appended claims.

BRIEF DESCRIPTION OF THE DRAWINGS

FIG. 10 shows selected screen data after manipulation on a touch screen interface.

FIG. 11 shows entries in memory for a default gesture and a custom gesture in some embodiments.

FIG. 15 shows a method for removing an equivalency between a custom gesture and a default gesture in some embodiments.

FIG. 16 shows a method for removing an equivalency between a custom gesture and a default gesture in other embodiments.

FIG. 17 shows a method for establishing an equivalency between a custom soft button and a default gesture.

FIG. 18 shows a method for using an equivalent custom soft button to manipulate selected screen data.

DETAILED DESCRIPTION OF A PREFERRED EMBODIMENT

Figure 1:
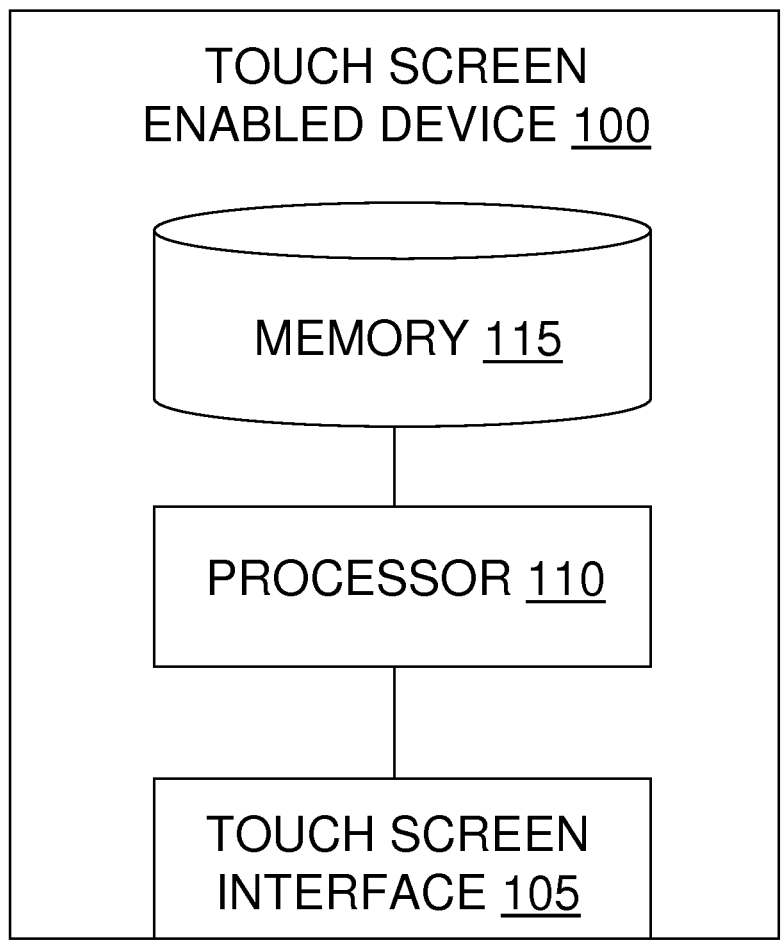
FIG. 1 shows a touch screen enabled device.

FIG. 1 shows a touch screen enabled device 100. Device 100 has a processor 110 communicatively coupled between a touch screen interface 105 and a memory 115. Interface 105 receives touch inputs from human users. Touch inputs may be made using a finger, handheld stylus or pointer that makes contact with a touch-sensitive surface of interface 105. Touch inputs received on interface 105 are interpreted and acted upon by processor 110 in consultation with memory 115. Interface 105 also displays outputs to users under the control of processor 110. Device 100 may be an electronic white board, tablet computer or smart phone, by way of example.

Figure 2:
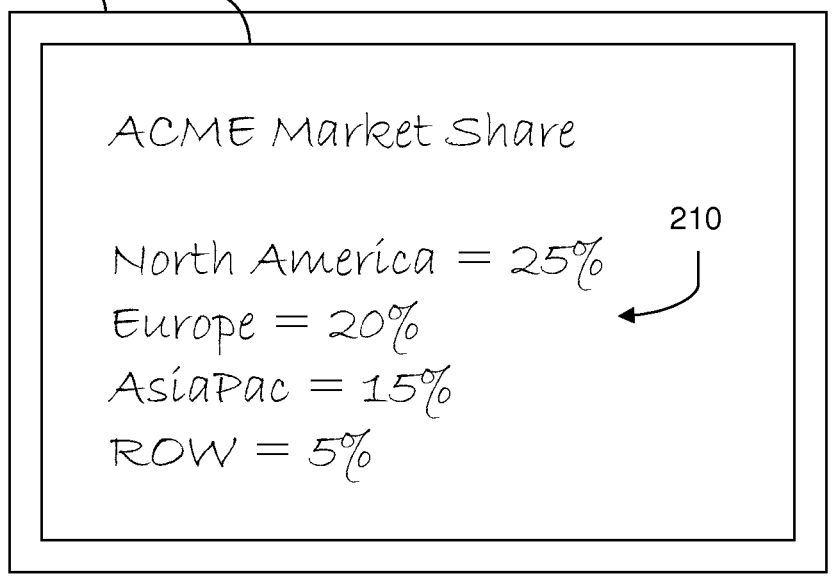
FIG. 2 shows screen data displayed on a touch screen interface.

FIG. 2 shows exemplary screen data 210 displayed on interface 105. Screen data 210 is shown to include text, numbers and mathematical symbols, although screen data may include images, vectors and other object types. Moreover, while screen data 210 is shown to include objects that are hand-drawn by a user on interface 105, screen data may include objects that are not hand-drawn, or a combination of hand-drawn and non-hand-drawn objects. (It bears noting that objects shown in FIGS. 2-10 that are characterized herein as hand-drawn were not actually hand-drawn on those figures but are meant to represent hand-drawn objects). Regardless of the origin of screen data, device 100 allows manipulation of screen data by users who first, through hand-drawn inputs on interface 105, establish equivalencies between custom gestures or custom soft buttons and default gestures and who then, through additional hand-drawn inputs on interface 105, invoke the equivalent custom gestures or custom soft buttons to manipulate selected screen data.

Figure 3:
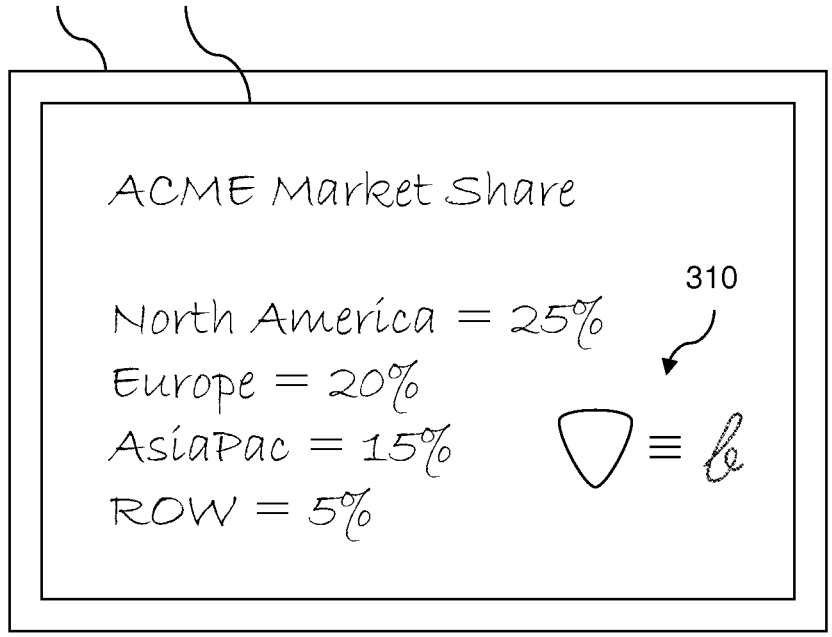
FIG. 3 shows a hand-drawn expression equating a custom gesture with a default gesture on a touch screen interface.
Figure 13:
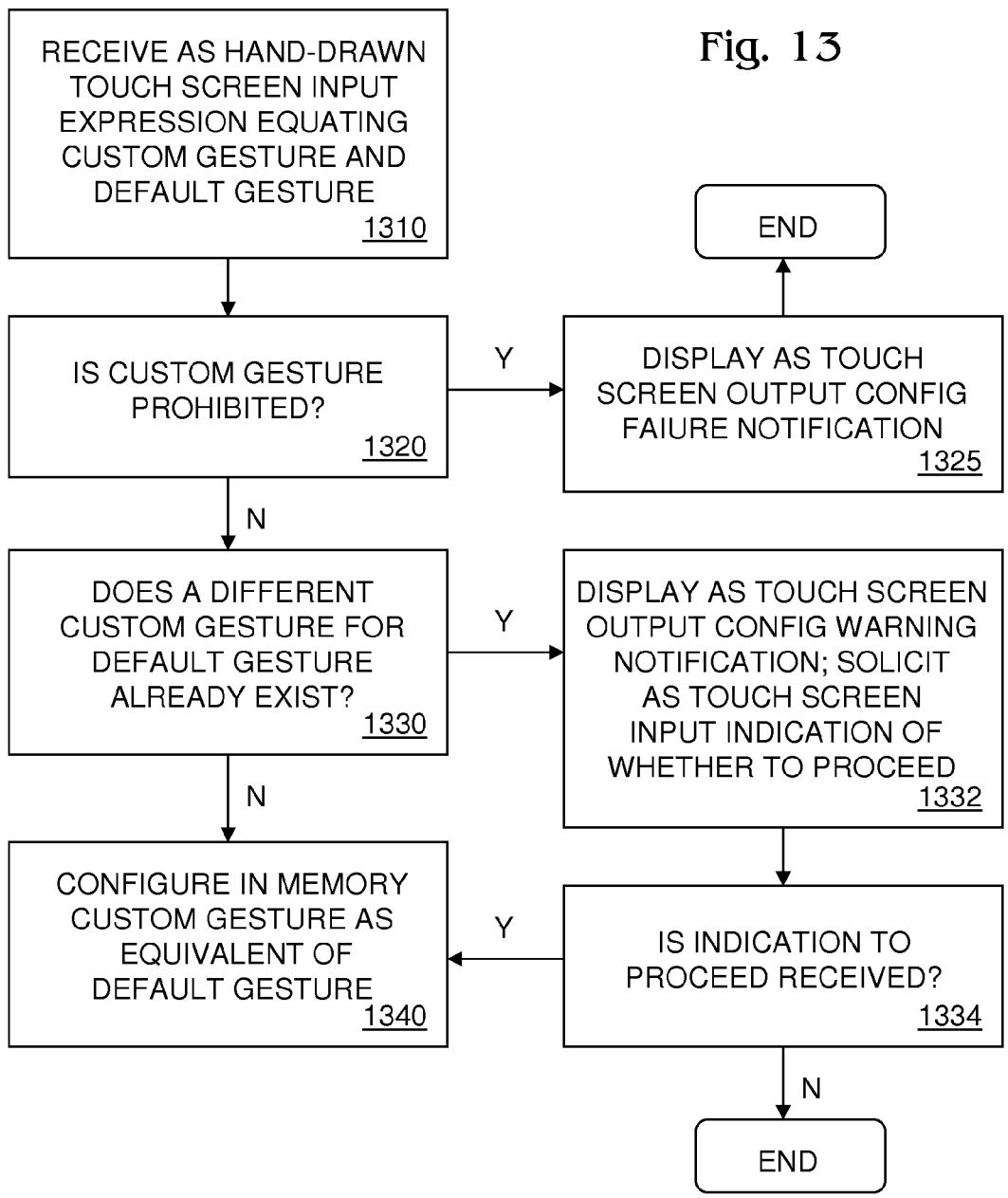
FIG. 13 shows a method for establishing an equivalency between a custom gesture and a default gesture.

A method for establishing an equivalency between a custom gesture and a default gesture will now be described by reference to FIG. 13 in conjunction with FIGS. 3 and 11. Before this method is performed, a default gesture is preconfigured in memory 115 by writing a first entry 1100 specifying drawing attributes 1110 and a screen action 1120 for the default gesture. In the example shown, the default gesture is a cursive "b" and the screen action is application of boldface type to selected data. Moreover, device 100 is configured to recognize three stacked lines as an equality symbol for configuration of equivalent custom gestures. At that point, interface 105 receives as hand-drawn input from a user who is giving a presentation an expression 310 equating a proposed equivalent custom gesture with the default gesture (1310). Expression 310 is realized by drawing the proposed equivalent custom gesture (an inverted triangle) to the left and drawing the default gesture (a cursive "b") to the right of the equality symbol (three stacked lines). Of course, an inverted triangle and three stacked lines are merely exemplary forms for a custom gesture and equality symbol. A custom gesture and equality symbol make take other forms that are distinguishable from common screen data such as letters in the English alphabet, Arabic numerals and common mathematical symbols.

Next, processor 110 interprets expression 310 and determines whether the proposed equivalent custom gesture is prohibited (1320). For example, the proposed equivalent custom gesture may be prohibited if the proposed equivalent custom gesture is preconfigured as a default gesture or is indistinguishable from common screen data such as letters in the English alphabet, Arabic numerals and common mathematical symbols. Processor 110 may consult a list of prohibited custom gestures in memory 115 in making this determination. If processor 110 determines that the proposed equivalent custom gesture is prohibited, a configuration failure notification is displayed on interface 105 under control of processor 110 (1325).

If processor 110 determines that the proposed equivalent custom gesture is not prohibited, processor 110 next determines whether a different equivalent custom gesture for the default gesture already exists (1330). Processor 110 may consult custom gestures configured in memory 115 in making this determination. If processor 110 determines that a different equivalent custom gesture for the default gesture already exists, a configuration warning notification is displayed on interface 105 under control of processor 110 advising the user of the different equivalent custom gesture and soliciting input from the user on whether to proceed in establishing an equivalency between the proposed equivalent custom gesture and the default gesture (1332). It should be noted that if an equivalency between the proposed equivalent custom gesture and the default gesture is created, the different equivalent custom gesture that already exists persists and the default gesture then has multiple equivalent custom gestures.

If processor 110 determines that a different equivalent custom gesture for the default gesture does not already exist, or that the user wishes to proceed despite the existence of a different equivalent custom gesture, processor 110 establishes an equivalency between the proposed equivalent custom gesture and the default gesture (1340). In that event, processor 110 configures in memory 115 a second entry 1150 specifying drawing attributes 1160 and a screen action 1170 for the new equivalent custom gesture, wherein the screen action is the same as the one specified for the default gesture. In the example shown, the new equivalent custom gesture is the inverted triangle and the screen action is application of boldface type to selected data.

Figure 12:
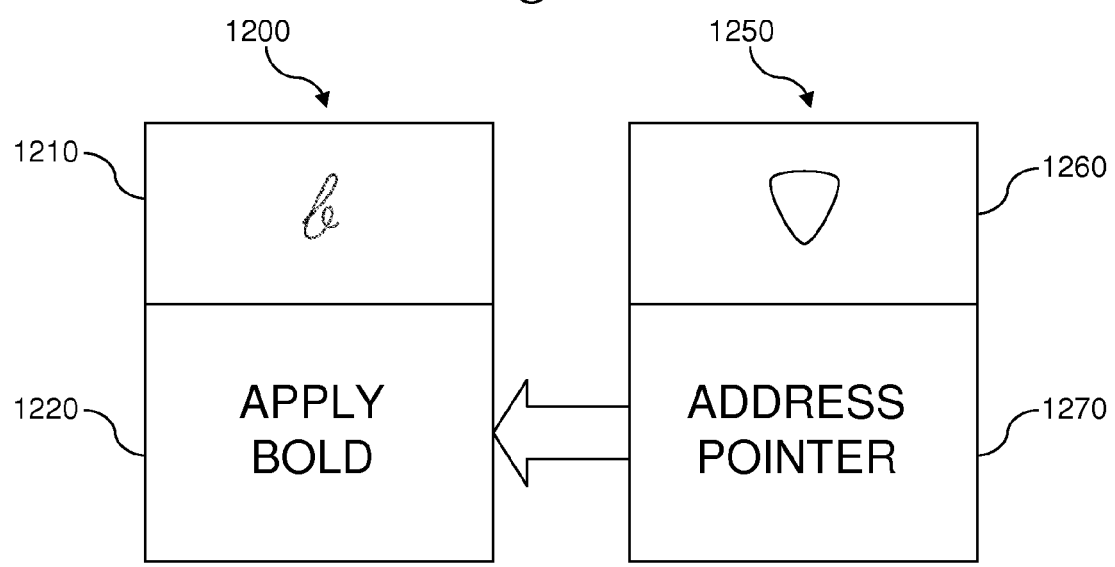
FIG. 12 shows entries in memory for a default gesture and a custom gesture in other embodiments.

FIG. 12 shows an alternative way to configure in memory 115 an equivalency between a new custom gesture and a default gesture. As in FIG. 11, a default gesture is preconfigured in memory 115 by storing a first entry 1200 specifying drawing attributes 1210 and a screen action 1220 for the default gesture. However, in establishing an equivalency between the new custom gesture and the default gesture in the alternative method, processor 110 configures in memory 115 a second entry 1250 specifying drawing attributes 1260 for the new custom gesture 1260 and a pointer 1270 to the address in memory 115 where the screen action for the default gesture is stored.

Figure 4:
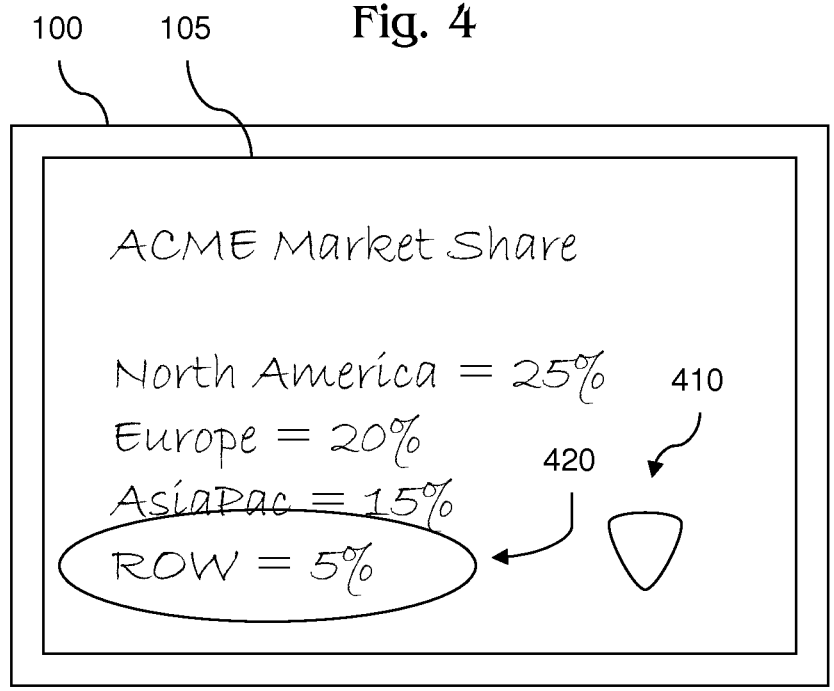
FIG. 4 shows a hand-drawn custom gesture and selected screen data to be manipulated on a touch screen interface.
Figure 5:
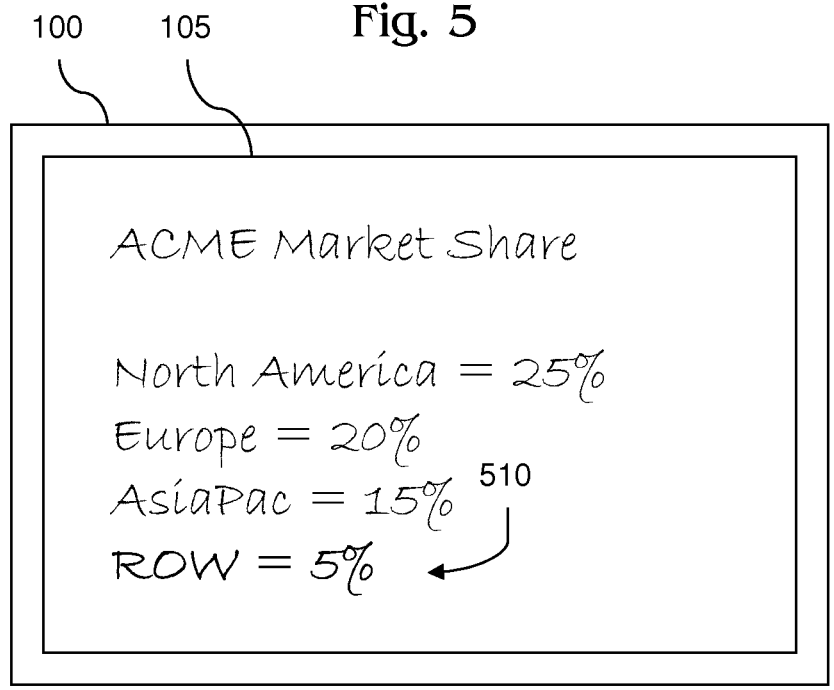
FIG. 5 shows selected screen data after manipulation on a touch screen interface.
Figure 14:
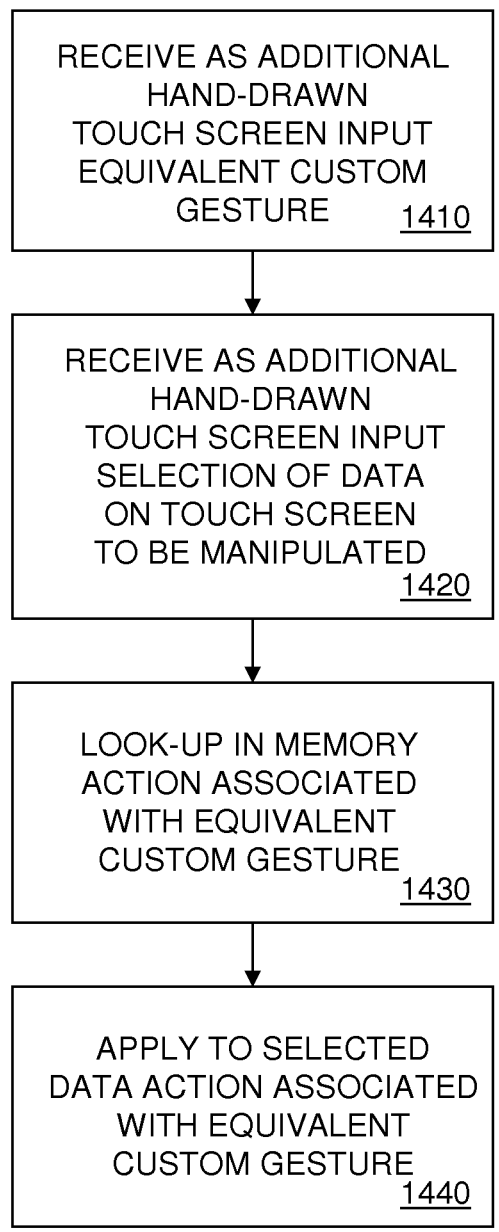
FIG. 14 shows a method for using an equivalent custom gesture to manipulate selected screen data.

A method for using an equivalent custom gesture to manipulate selected screen data will now be described by reference to FIG. 14 in conjunction with FIGS. 4 and 5. Before this method is performed, an equivalent custom gesture (e.g., inverted triangle) for a default gesture (e.g., cursive "b") associated with a given screen action (e.g., apply bold) is established in memory 115 as described above. The method commences when touch screen interface 105 receives as hand-drawn input from a user an equivalent custom gesture 410 in isolation, that is, decoupled from any expression (1410). Interface 105 also receives as hand-drawn input from the user a selection of screen data to be manipulated 420 (1420). Processor 110 uses custom gesture 410 to look-up in memory 115 a screen action 1170, 1220 associated with custom gesture 410 (1430). For example, processor 110 searches memory 115 and detects a pattern match between custom gesture 410 and drawing attributes 1160 and identifies screen action 1170 associated with drawing attributes 1160. Alternatively, processor 110 searches memory 115 and detects a pattern match between custom gesture 410 and drawing attributes 1260 and uses pointer 1270 associated with drawing attributes 1260 to identify screen action 1220 associated with drawing attributes 1260. Processor 110 then applies screen action 1170, 1220 to selected screen data 420 (1440), resulting in selected screen data 420 being rendered as bold screen data 510.

Figure 6:
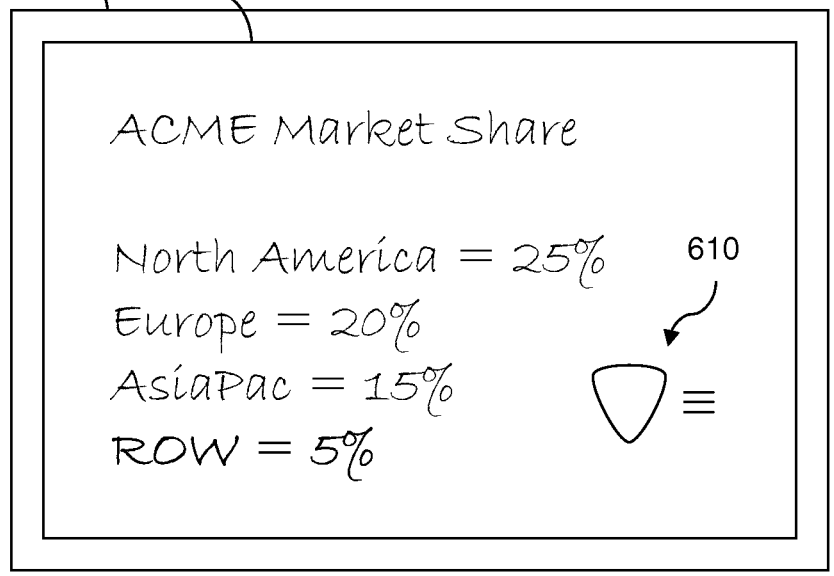
FIG. 6 shows a hand-drawn incomplete expression juxtaposing a custom gesture with an equality symbol on a touch screen interface.

A first method for removing an equivalency between an equivalent custom gesture and a default gesture will now be described by reference to FIG. 15 in conjunction with FIG. 6. Before this method is performed, an equivalent custom gesture (e.g., inverted triangle) for a default gesture (e.g., cursive "b") associated with a given action (e.g., apply bold) is established in memory 115 as described above. The method commences with interface 105 receiving as hand-drawn input from a user an incomplete expression 610 juxtaposing the equivalent custom gesture with an equality symbol recognized by device 100 (1510). Processor 110 recognizes that expression 610 is incomplete, starts a timer (1520) and monitors whether expression 610 is completed before the timer expires (1530). The timer gives the user a predetermined time (e.g., five seconds) to complete expression 610 by drawing a gesture to the right of the equality symbol. If processor 110 detects that expression 610 is completed before the timer expires, processor 110 reconfigures the equivalent custom gesture stored in memory 115 by removing the existing equivalency between the custom gesture and the default gesture and establishing a new equivalency between the custom gesture and the gesture to the right of the equality symbol (1535). On the other hand, if expression 610 is not completed before the timer expires, processor 110 removes from memory 115 the existing equivalency between the custom gesture and the default gesture without establishing a new equivalency (1540).

Figure 7:
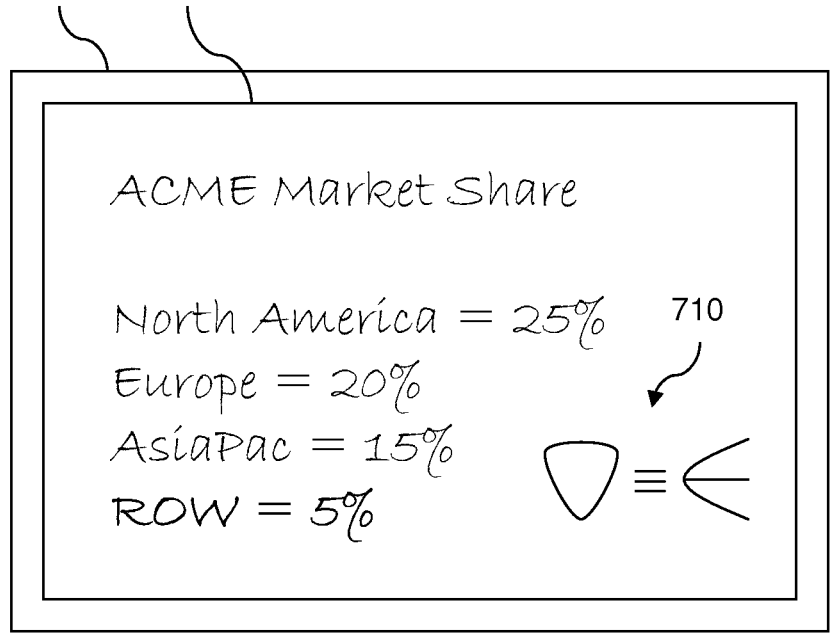
FIG. 7 shows a hand-drawn expression equating a custom gesture with a removal symbol on a touch screen interface.

A second method for removing an equivalency between an equivalent custom gesture and a default gesture will now be described by reference to FIG. 16 in conjunction with FIG. 7. Before this method is performed, an equivalent custom gesture (e.g., inverted triangle) for a default gesture (e.g., cursive "b") associated with a given action (e.g., apply bold) is established in memory 115 as described above. The method commences with interface 105 receiving as hand-drawn input from a user an expression 710 equating the equivalent custom gesture with a removal symbol recognized by device 100 (1610). Expression 710 is realized by drawing the custom gesture to the left and drawing the removal symbol (fork-like symbol) to the right of an equality symbol recognized by device 100. Processor 110 interprets the expression and removes from memory 115 the equivalency between the custom gesture and the default gesture without establishing a new equivalency (1620). Naturally, the fork-like symbol in FIG. 7 is merely exemplary of a removal symbol. A different removal symbol may be configured on device 100.

Figure 8:
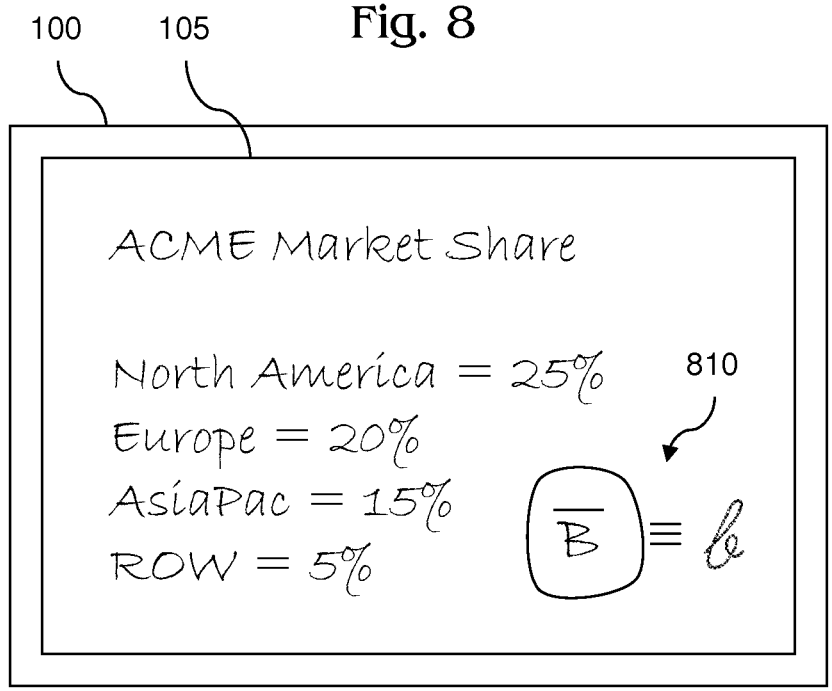
FIG. 8 shows a hand-drawn expression equating a custom soft button with a default gesture on a touch screen interface.

A method for establishing an equivalency between a custom soft button and a default gesture will now be described by reference to FIG. 17 in conjunction with FIG. 8. Before this method is performed, a default gesture is preconfigured in memory 115 by storing a first entry specifying drawing attributes and a screen action for the default gesture. In the present example, the default gesture is a cursive "b" and the screen action is application of boldface type to selected data. The method starts with interface 105 receiving as hand-drawn input from a user who is giving a presentation an expression 810 equating a proposed equivalent custom soft button with the default gesture (1710). Expression 810 is realized by drawing the proposed equivalent custom soft button (an enclosed "B" having an overhead line) to the left and drawing the default gesture (a cursive "b") to the right of an equality symbol (three stacked lines) recognized by device 100. Of course, an enclosed "B" having an overhead line and three stacked lines are merely exemplary forms for a custom soft button and equality symbol. A custom soft button and equality symbol make take other forms that are distinguishable from common screen data such as letters in the English alphabet and Arabic numerals and common mathematical symbols. In some embodiments, to distinguish a custom soft button from common screen data, the custom soft buttons is required to have a perimeter forming an enclosure (e.g., square, circle, rectangle, etc.), a symbol (e.g., letter, number, etc.) within the enclosure and a symbol validator (e.g., overhead line, underline, etc.) within the enclosure.

Next, processor 110 interprets expression 810 and determines whether the proposed equivalent custom soft button is prohibited (1720). By way of example, the proposed equivalent custom soft button may be prohibited if it fails to conform with requirements for a custom soft button, such as having a perimeter forming an enclosure, a symbol within the enclosure and a symbol validator within the enclosure. Processor 110 may consult a list of requirements for custom soft buttons in memory 115 in making this determination. If processor 110 determines that the proposed equivalent custom soft button is prohibited, processor 110 causes to be displayed on interface 105 a configuration failure notification (1725).

If processor 110 determines that the proposed equivalent custom soft button is not prohibited, processor 110 next determines whether a different equivalent custom soft button for the default gesture already exists (1730). Processor 110 may consult equivalent custom soft buttons configured in memory 115 in making this determination. If processor 110 determines that a different equivalent custom soft button for the default gesture already exists, processor 110 causes to be displayed on interface 105 a configuration warning notification advising the user of the equivalent custom soft button and soliciting input from the user on whether to proceed in establishing an equivalency between the proposed equivalent custom soft button and the default gesture (1732).

If processor 110 determines that a different equivalent custom soft button for the default gesture does not already exist or that the user wishes to proceed despite the existence of a different equivalent, processor 110 proceeds with establishing an equivalency between the proposed equivalent custom soft button and the default gesture (1740). In that event, processor 110 configures in memory 115, in a manner analogous to that described in FIG. 11 with respect to configuration of equivalent custom gestures, an entry specifying drawing attributes for the new equivalent custom soft button and a screen action for the new equivalent custom soft button, wherein the screen action the same as the screen action for the default gesture. Alternatively, processor 110 configures in memory 115, in a manner analogous to that described in FIG. 12 with respect to configuration of equivalent custom gestures, an entry specifying drawing attributes for the new equivalent custom soft button and a pointer to the memory address where the screen action for the default gesture is stored.

Figure 9:
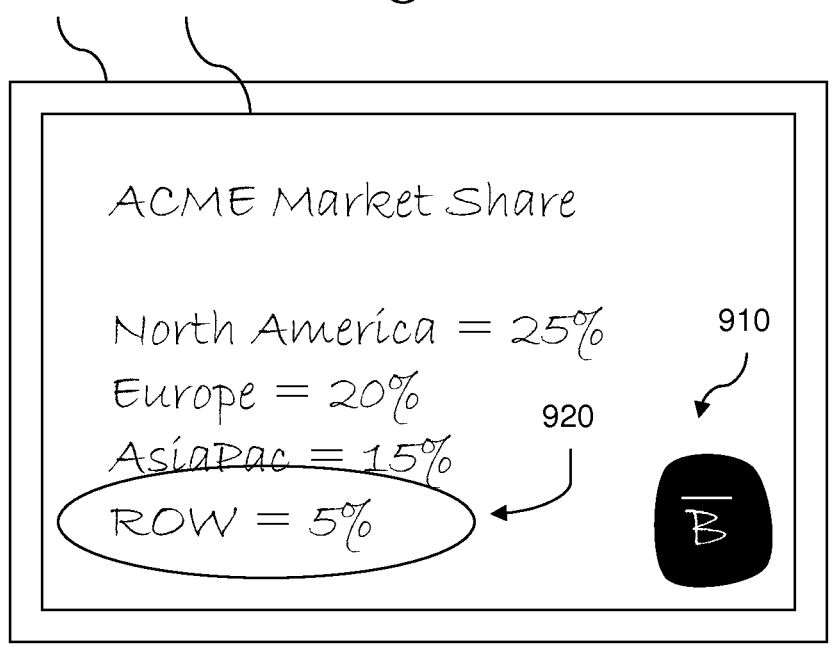
FIG. 9 shows a hand-drawn custom soft button that has been pressed and selected screen data to be manipulated on a touch screen interface.

A method for using an equivalent custom soft button to manipulate selected screen data will now be described by reference to FIG. 18 in conjunction with FIGS. 9 and 10. Before this method is performed, an equivalent custom soft button (e.g., enclosed "B" with overhead line) for a default gesture (e.g., cursive "b") associated with a given action (e.g., apply bold) is established in memory 115 as described above. The method commences with touch screen interface 105 receiving as hand-drawn input from a user the equivalent custom soft button 910 in isolation, that is, decoupled from any expression (1810). Custom soft button 910 may be drawn on interface 105 at a location convenient for the user. Moreover, multiple instances of soft button 910 may be drawn and coexist on interface 105 at different convenient locations. Furthermore, custom soft button 910 may be moved from one location of interface 105 to another by dragging and dropping custom soft button 910. Interface 105 also receives as hand-drawn input from the user a selection of screen data to be manipulated 920 (1820). Interface 105 then receives as further input from the user a button press on custom soft button 910, which causes custom soft button 910 to change complexion as shown in FIG. 9 (1830). Processor 110 responds to the button press by looking-up in memory 115 a screen action associated with custom soft button 910 (1840). Processor 110 then applies the screen action to selected screen data 920 (1850), resulting in selected screen data 920 being rendered as bold screen data 1010. Custom soft button 910 then reverts back to its original complexion as shown in FIG. 10, but unless erased remains on interface 105 for additional use.

Equivalencies between custom soft buttons and default gestures may be removed using methods analogous to those described in FIGS. 15 and 16 with respect to removal of equivalencies between custom gestures and default gestures.

While selection of data to be manipulated has been illustrated herein as being achieved by lassoing the selected data, selection of data to be manipulated may be accomplished by other means, such as tapping on the selected data.

While drawing an equivalent custom gesture or pressing on an equivalent custom soft button has been illustrated herein as preceding selection of screen data to be manipulated, a different sequence may be used. For example, selection of screen data to be manipulated may precede drawing of an equivalent custom gesture or pressing on an equivalent custom soft button, or selection of screen data to be manipulated may be made while an equivalent custom soft button is being pressed.

While established equivalencies between custom gestures/soft buttons and default gestures have been described herein as persisting in memory 115 until removed, automatic removal of equivalencies based on predetermined criteria may be configured through administrative or user action. For example, equivalencies may be automatically removed a predetermined time after creation (e.g., six hours), at a predetermined time of day (e.g., midnight) or when a user logs-off device 100.

Where established equivalencies are configured to be automatically removed from memory 115, these equivalent custom gestures/soft buttons may persist by saving them in personal equivalency data files (PEDFs) stored on an external memory element (e.g., network storage) or removable memory element (e.g., thumb drive). Device 100 may have a tool invocable on interface 105 that allows users to specify which of their equivalent custom gestures/soft buttons are saved to their PEDF and where the PEDF is stored. When a user returns to device 100, the user may access his or her PEDF and load his or her saved equivalent custom gestures/soft buttons on device 100. PEDFs may have a specific mime type such as ".eqv" to identify them as containing equivalent custom gestures/soft buttons.

Entries for equivalent custom gestures/soft buttons may be written/loaded in a temporary area of memory 115 whereas default gestures may be written in a permanent area of memory 115.

Finally, while in illustrated examples the screen action associated with equivalent custom gestures and custom soft buttons is application of boldface type to selected data, an equivalent custom gesture or custom soft button may be associated with a wide range of screen actions, including without limitation animating, bounding, coloring, copying, cutting, deleting, duplicating, enlarging, graphing, highlighting, indenting, inserting, italicizing, justifying, pasting, printing, reducing, saving, spellchecking and underlining.

It will be appreciated by those of ordinary skill in the art that the invention can be embodied in other specific forms without departing from the spirit or essential character hereof. The present description is thus considered in all respects to be illustrative and not restrictive. The scope of the invention is indicated by the appended claims, and all changes that come with in the meaning and range of equivalents thereof are intended to be embraced therein.

What is claimed is:

1. A touch screen enabled device, comprising:
  a memory having a default gesture defined therein;
  a touch screen interface configured to receive as hand-drawn input a first expression equating a first custom soft button with the default gesture; and
  a processor operatively coupled with the memory and the touch screen interface configured to establish in response to the first expression an equivalency between the first custom soft button and the default gesture, wherein before establishing the equivalency selected screen data on the touch screen enabled device are manipulable in response to receiving as hand-drawn input on the touch screen interface the default gesture, and wherein after establishing the equivalency selected screen data on the touch screen enabled device are also manipulable in response to receiving as hand-drawn input the interface the first custom soft button and receiving as further input on the touch screen interface a button press on the first custom soft button.

2. The device of claim 1, wherein the memory has a first entry therein specifying drawing attributes of the default gesture and a screen action for the default gesture and establishing the equivalency comprises configuring in the memory a second entry specifying drawing attributes of the first custom soft button and the screen action.

3. The device of claim 1, wherein the memory has a first entry therein specifying drawing attributes of the default gesture and a screen action for the default gesture and establishing the equivalency comprises configuring in the memory a second entry specifying drawing attributes of first custom soft button and a pointer to the screen action.

4. The device of claim 1, wherein the processor is further configured to determine whether an equivalency between a second custom soft button and the default gesture is established and under control of the processor in response to determining that an equivalency between a second custom soft button and the default gesture is established display on the touch screen interface a warning notification soliciting input on whether to proceed with establishing the equivalency between the first custom soft button and the default gesture.

5. The device of claim 1, wherein the touch screen interface is further configured to receive as additional hand-drawn input the first custom soft button and a selection of screen data to be manipulated, and receive as further input a button press on the first custom soft button, and the processor is further configured to determine in response to the button press a screen action associated with the first custom soft button and manipulate the selected screen data in accordance with the screen action.

6. The device of claim 1, wherein the touch screen interface is further configured to receive as additional hand-drawn input an incomplete expression juxtaposing the first custom soft button with an equality symbol, and the processor is further configured to remove in response to the incomplete expression the equivalency between the first custom soft button and the default gesture.

7. The device of claim 1, wherein the touch screen interface is further configured to receive as additional hand-drawn input a second expression equating the first custom soft button with a removal symbol, and the processor is further configured to remove in response to the second expression the equivalency between the first custom soft button and the default gesture.

8. The device of claim 1, wherein the first custom soft button comprises a perimeter forming an enclosure, a symbol within the enclosure and a symbol validator within the enclosure.

9. A method for configuring a custom soft button that is equivalent to a default gesture on a touch screen enabled device, comprising:
  providing on a touch screen enabled device a memory having a default gesture defined therein;
  receiving by the device as hand-drawn input on a touch screen interface an expression equating a custom soft button with the default gesture;
  establishing by the device in the memory in response to the expression an equivalency between the custom soft button and the default gesture;
  receiving by the device as further hand-drawn input on the touch screen interface the custom soft button;
  receiving by the device as further input on the touch screen interface a button press on the custom soft button; and
  manipulating on the device selected screen data in response to the button press.

10. The method of claim 9, wherein the manipulating step comprises animating the selected screen data.

11. The method of claim 9, wherein the manipulating step comprises graphing the selected screen data.

12. The method of claim 9, wherein the manipulating step comprises printing the selected screen data.

13. The method of claim 9, wherein the manipulating step comprises saving the selected screen data.

14. The method of claim 9, wherein the manipulating step comprises spellchecking the selected screen data.

15. The method of claim 9, wherein the custom soft button comprises a perimeter forming an enclosure, a symbol within the enclosure and a symbol validator within the enclosure.

\* \* \* \* \*

UNITED STATES PATENT AND TRADEMARK OFFICE
CERTIFICATE OF CORRECTION

| | | |
|---|---|---|
| PATENT NO. | : 9,189,149 B2 | Page 1 of 1 |
| APPLICATION NO. | : 13/848659 | |
| DATED | : November 17, 2015 | |
| INVENTOR(S) | : William John Vojak | |

It is certified that error appears in the above-identified patent and that said Letters Patent is hereby corrected as shown below:

IN THE CLAIMS

Column 9, line 65, replace "input the interface" with --input on the touch screen interface--.

Signed and Sealed this
Ninth Day of February, 2016

Michelle K. Lee
*Director of the United States Patent and Trademark Office*